US008473561B2

(12) United States Patent
Brown et al.

(10) Patent No.: US 8,473,561 B2
(45) Date of Patent: *Jun. 25, 2013

(54) SYSTEM AND METHOD FOR HANDLING ELECTRONIC MAIL MISMATCHES

(71) Applicant: Research in Motion Limited, Waterloo (CA)

(72) Inventors: Michael Kenneth Brown, Fergus (CA); Michael Stephen Brown, Kitchener (CA); Timothy Lee Segato, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/672,073

(22) Filed: Nov. 8, 2012

(65) Prior Publication Data

US 2013/0067009 A1 Mar. 14, 2013

Related U.S. Application Data

(63) Continuation of application No. 12/896,224, filed on Oct. 1, 2010, now Pat. No. 8,312,165, which is a continuation of application No. 11/473,313, filed on Jun. 23, 2006, now Pat. No. 7,814,161.

(51) Int. Cl.
G06F 15/16 (2006.01)
H04L 29/06 (2006.01)

(52) U.S. Cl.
USPC ............................ 709/206; 709/245; 713/156

(58) Field of Classification Search
USPC ................................... 709/206, 245; 713/156
See application file for complete search history.

(56) References Cited

U.S. PATENT DOCUMENTS

| 4,028,500 | A | 6/1977 | McClure et al. |
| 5,410,602 | A | 4/1995 | Finkelstein et al. |
| 5,457,748 | A | 10/1995 | Bergum et al. |
| 5,623,546 | A | 4/1997 | Hardy et al. |

(Continued)

FOREIGN PATENT DOCUMENTS

| AU | 2005204221 A1 | 3/2006 |
| AU | 2005204223 A1 | 3/2006 |

(Continued)

OTHER PUBLICATIONS

Gutmann, P., "A Reliable, Scalable General-purpose Certificate Store", ACSAC 2000.

(Continued)

Primary Examiner — Thomas Dailey
Assistant Examiner — Ebrahim Golabbakhsh
(74) Attorney, Agent, or Firm — Bereskin & Parr LLP/S.E.N.C.R.L., s.r.l.

(57) ABSTRACT

A system and method for handling e-mail address mismatches between the address contained within a user's certificate or certificate chain, and the account address actually being used is disclosed. In order to resolve address mismatches a canonical or generic domain name or user name may, for example, be used as a lifelong address of a user that is contained in the user's certificate. Upon detection of an address mismatch, the system and method disclosed herein may automatically re-check the certificate or search for a certificate containing the canonical or generic domain name and/or user name to attempt to resolve the mismatch.

20 Claims, 9 Drawing Sheets

U.S. PATENT DOCUMENTS

| | | | |
|---|---|---|---|
| 5,634,051 A | 5/1997 | Thomson | |
| 5,666,530 A | 9/1997 | Clark et al. | |
| 5,710,922 A | 1/1998 | Alley et al. | |
| 5,727,202 A | 3/1998 | Kucala et al. | |
| 5,778,068 A | 7/1998 | Johnson et al. | |
| 5,778,346 A | 7/1998 | Frid et al. | |
| 5,812,671 A | 9/1998 | Ross et al. | |
| 5,870,030 A | 2/1999 | DeLuca et al. | |
| 5,956,707 A | 9/1999 | Chu | |
| 5,991,399 A | 11/1999 | Graunke et al. | |
| 6,000,000 A | 12/1999 | Hawkins et al. | |
| 6,061,448 A | 5/2000 | Smith et al. | |
| 6,073,237 A | 6/2000 | Ellison et al. | |
| 6,081,601 A | 6/2000 | Raivisto et al. | |
| 6,084,969 A | 7/2000 | Wright et al. | |
| 6,085,323 A | 7/2000 | Shimizu et al. | |
| 6,119,228 A | 9/2000 | Angelo et al. | |
| 6,125,369 A | 9/2000 | Wu et al. | |
| 6,209,098 B1 | 3/2001 | Davis | |
| 6,219,694 B1 | 4/2001 | Lazaridis et al. | |
| 6,229,894 B1 | 5/2001 | Van Oorschot et al. | |
| 6,230,186 B1 | 5/2001 | Yaker | |
| 6,233,572 B1 | 5/2001 | Crawford, Jr. et al. | |
| 6,266,420 B1 | 7/2001 | Langford et al. | |
| 6,266,775 B1 | 7/2001 | Kamba | |
| 6,289,105 B1 | 9/2001 | Murota | |
| 6,301,658 B1 | 10/2001 | Koehler | |
| 6,313,732 B1 | 11/2001 | DeLuca et al. | |
| 6,348,972 B1 | 2/2002 | Taniguchi et al. | |
| 6,377,946 B1 | 4/2002 | Okamoto et al. | |
| 6,389,455 B1 | 5/2002 | Fuisz | |
| 6,531,985 B1 | 3/2003 | Jones et al. | |
| 6,564,320 B1 | 5/2003 | de Silva et al. | |
| 6,567,914 B1 | 5/2003 | Just et al. | |
| 6,633,873 B1 | 10/2003 | Nakamura | |
| 6,661,927 B1 | 12/2003 | Suarez et al. | |
| 6,697,942 B1 | 2/2004 | L'Heureux et al. | |
| 6,725,262 B1 | 4/2004 | Choquier et al. | |
| 6,732,144 B1 | 5/2004 | Kizu et al. | |
| 6,745,024 B1 | 6/2004 | DeJaco et al. | |
| 6,779,115 B1 | 8/2004 | Naim | |
| 6,819,766 B1 | 11/2004 | Weidong | |
| 6,829,357 B1 | 12/2004 | Alrabady et al. | |
| 6,904,521 B1 | 6/2005 | Jivsov | |
| 6,918,038 B1 | 7/2005 | Smith et al. | |
| 6,925,568 B1 | 8/2005 | Heinonen | |
| 6,931,532 B1 | 8/2005 | Davis et al. | |
| 6,983,367 B2 | 1/2006 | Go et al. | |
| 6,993,137 B2 | 1/2006 | Fransdonk | |
| 6,996,720 B1 | 2/2006 | DeMello et al. | |
| 7,003,667 B1 | 2/2006 | Slick et al. | |
| 7,020,708 B2 | 3/2006 | Nelson et al. | |
| 7,028,186 B1 | 4/2006 | Stenman et al. | |
| 7,032,240 B1 | 4/2006 | Cronce et al. | |
| 7,113,927 B1 | 9/2006 | Tanaka et al. | |
| 7,127,604 B2 | 10/2006 | Lide et al. | |
| 7,171,552 B1 | 1/2007 | Bell | |
| 7,213,047 B2 | 5/2007 | Yeager et al. | |
| 7,228,418 B1 | 6/2007 | Girault | |
| 7,254,608 B2 | 8/2007 | Yeager et al. | |
| 7,254,712 B2 | 8/2007 | Godfrey et al. | |
| 7,299,502 B2 | 11/2007 | Schmeling et al. | |
| 7,373,512 B1 | 5/2008 | Just | |
| 7,430,663 B2 | 9/2008 | Brown et al. | |
| 7,529,374 B2 | 5/2009 | Huttunen | |
| 7,546,453 B2 | 6/2009 | Little et al. | |
| 7,549,043 B2 | 6/2009 | Adams et al. | |
| 7,627,896 B2 | 12/2009 | Herrmann | |
| 7,640,428 B2 | 12/2009 | Adams et al. | |
| 7,653,698 B2 | 1/2010 | Wieneke et al. | |
| 7,664,947 B2 | 2/2010 | Fang | |
| 7,814,161 B2 | 10/2010 | Brown et al. | |
| 8,209,530 B2 | 6/2012 | Adams et al. | |
| 8,301,878 B2 | 10/2012 | Brown et al. | |
| 2001/0011308 A1 | 8/2001 | Clark et al. | |
| 2001/0046307 A1 | 11/2001 | Wong | |
| 2001/0050990 A1 | 12/2001 | Sudia | |
| 2002/0007453 A1 | 1/2002 | Nemovicher | |
| 2002/0032861 A1 | 3/2002 | Azuma | |
| 2002/0035685 A1 | 3/2002 | Ono et al. | |
| 2002/0035687 A1 | 3/2002 | Skantze | |
| 2002/0051544 A1 | 5/2002 | Kikuchi et al. | |
| 2002/0053023 A1 | 5/2002 | Patterson et al. | |
| 2002/0059375 A1 | 5/2002 | Pivowar et al. | |
| 2002/0059383 A1 | 5/2002 | Katsuda | |
| 2002/0080752 A1 | 6/2002 | Johansson et al. | |
| 2002/0099766 A1 | 7/2002 | Tuli | |
| 2002/0147905 A1 | 10/2002 | Perlman | |
| 2002/0165967 A1 | 11/2002 | Morgan | |
| 2002/0169954 A1 | 11/2002 | Bandini et al. | |
| 2002/0173295 A1 | 11/2002 | Nykanen et al. | |
| 2002/0176067 A1 | 11/2002 | Charbon | |
| 2003/0002671 A1 | 1/2003 | Inchalik et al. | |
| 2003/0028647 A1 | 2/2003 | Grosu | |
| 2003/0074555 A1 | 4/2003 | Fahn et al. | |
| 2003/0126085 A1 | 7/2003 | Srinivasan | |
| 2003/0163567 A1* | 8/2003 | McMorris et al. ............ 709/225 | |
| 2003/0172122 A1 | 9/2003 | Little et al. | |
| 2003/0196084 A1 | 10/2003 | Okereke et al. | |
| 2003/0198350 A1 | 10/2003 | Foster et al. | |
| 2003/0212888 A1 | 11/2003 | Wildish et al. | |
| 2004/0030681 A1 | 2/2004 | Shannon et al. | |
| 2004/0052356 A1 | 3/2004 | McKinzie et al. | |
| 2004/0083364 A1 | 4/2004 | Andreaux et al. | |
| 2004/0093493 A1 | 5/2004 | Bisbee et al. | |
| 2004/0133520 A1 | 7/2004 | Callas et al. | |
| 2004/0133775 A1 | 7/2004 | Callas et al. | |
| 2004/0171369 A1 | 9/2004 | Little et al. | |
| 2004/0177248 A1 | 9/2004 | Yoshida | |
| 2004/0196978 A1 | 10/2004 | Godfrey et al. | |
| 2004/0202327 A1 | 10/2004 | Little et al. | |
| 2004/0205248 A1 | 10/2004 | Little et al. | |
| 2005/0005097 A1 | 1/2005 | Murakawa | |
| 2005/0039100 A1 | 2/2005 | Bade et al. | |
| 2005/0055372 A1 | 3/2005 | Springer | |
| 2005/0080642 A1 | 4/2005 | Daniell | |
| 2005/0114671 A1 | 5/2005 | Little et al. | |
| 2005/0148323 A1 | 7/2005 | Little et al. | |
| 2005/0149442 A1 | 7/2005 | Adams et al. | |
| 2005/0163320 A1 | 7/2005 | Brown et al. | |
| 2005/0188219 A1 | 8/2005 | Annic et al. | |
| 2005/0203855 A1 | 9/2005 | Malcolm | |
| 2005/0210289 A1 | 9/2005 | Brown et al. | |
| 2005/0222991 A1 | 10/2005 | Ikenoya | |
| 2005/0246763 A1 | 11/2005 | Corcoran et al. | |
| 2006/0015722 A1 | 1/2006 | Rowan et al. | |
| 2006/0036848 A1 | 2/2006 | Brown et al. | |
| 2006/0036849 A1* | 2/2006 | Brown et al. ................. 713/156 | |
| 2006/0036865 A1 | 2/2006 | Brown et al. | |
| 2006/0059332 A1 | 3/2006 | Adams et al. | |
| 2006/0143700 A1 | 6/2006 | Herrmann | |
| 2007/0083749 A1 | 4/2007 | Fang | |
| 2007/0118874 A1 | 5/2007 | Adams et al. | |
| 2007/0123307 A1 | 5/2007 | Adams et al. | |
| 2007/0165844 A1 | 7/2007 | Little | |
| 2007/0299921 A1 | 12/2007 | Brown et al. | |
| 2008/0016359 A1 | 1/2008 | Godfrey et al. | |
| 2008/0306922 A1 | 12/2008 | Brown et al. | |
| 2009/0199007 A1 | 8/2009 | Adams et al. | |
| 2010/0100730 A1 | 4/2010 | Adams et al. | |
| 2012/0239927 A1 | 9/2012 | Adams et al. | |
| 2013/0013917 A1 | 1/2013 | Brown et al. | |

FOREIGN PATENT DOCUMENTS

| | | |
|---|---|---|
| CA | 2476914 A1 | 2/2006 |
| CN | 100566236 C | 12/2009 |
| EP | 0500222 | 8/1992 |
| EP | 0500245 | 8/1992 |
| EP | 0841770 | 5/1998 |
| EP | 0942568 | 9/1999 |
| EP | 1096725 A2 | 5/2001 |
| EP | 1580953 A1 | 9/2005 |
| EP | 1096727 A2 | 3/2006 |
| EP | 1633100 A1 | 3/2006 |
| EP | 1633101 A1 | 3/2006 |
| EP | 1806683 A1 | 7/2007 |
| EP | 1871060 | 12/2007 |

| | | |
|---|---|---|
| EP | 1936920 A1 | 6/2008 |
| GB | 2328125 A | 2/1999 |
| JP | 06276221 | 9/1994 |
| JP | 06276221 A | 9/1994 |
| JP | 07162407 A | 6/1995 |
| JP | 7509333 T | 10/1995 |
| JP | 08251221 A | 9/1996 |
| JP | 09046330 A | 2/1997 |
| JP | 10022992 A | 1/1998 |
| JP | 10107832 A | 4/1998 |
| JP | 200010477 | 6/1998 |
| JP | 11272581 A | 10/1999 |
| JP | 11272582 A | 10/1999 |
| JP | 2001103571 A | 4/2001 |
| JP | 2001197055 A | 7/2001 |
| JP | 2001265216 A | 9/2001 |
| JP | 2002163395 A | 6/2002 |
| JP | 2002535884 A | 10/2002 |
| JP | 2003046499 A | 2/2003 |
| JP | 2003348078 A | 12/2003 |
| JP | 2004048139 A | 2/2004 |
| JP | 2004179724 A | 6/2004 |
| KR | 1020030059303 A | 7/2003 |
| KR | 10-0650432 | 11/2006 |
| TW | 200629858 | 8/2006 |
| TW | 1282231 | 6/2007 |
| WO | 9412938 A1 | 6/1994 |
| WO | 9636934 A1 | 11/1996 |
| WO | 9741661 A2 | 11/1997 |
| WO | 9834374 A1 | 8/1998 |
| WO | 9905814 A2 | 2/1999 |
| WO | 9906900 A2 | 2/1999 |
| WO | 99/17564 | 4/1999 |
| WO | 9927678 A2 | 6/1999 |
| WO | 9963709 A2 | 12/1999 |
| WO | 0031931 A1 | 6/2000 |
| WO | 0069114 A1 | 11/2000 |
| WO | 0072506 A1 | 11/2000 |
| WO | 01/01644 | 1/2001 |
| WO | 0116933 A1 | 3/2001 |
| WO | 0124434 A1 | 4/2001 |
| WO | 0163386 A1 | 8/2001 |
| WO | 01/41353 | 9/2001 |
| WO | 0171608 A2 | 9/2001 |
| WO | 0178491 A2 | 10/2001 |
| WO | 02101580 A1 | 12/2002 |
| WO | 03/009561 | 1/2003 |
| WO | 03005636 A1 | 1/2003 |
| WO | 03/079627 | 9/2003 |
| WO | 03/079628 | 9/2003 |

OTHER PUBLICATIONS

Ramsdell, B., "S/MIME Version 3 Certificate handling" (RFC 2635), Jun. 1999.
Miyagawa, "Internet security course styarting from zero" second period, ASCII network PRO, vol. 5, No. 6, Japan ASSCII Corporation, Jun. 2000, vol. 5, pp. 96-99.
Shikii, C++ Builder component programming [26], DDJ vol. 8, No. 3, Japan, Shoei Corporation, Mar. 1999, vol. 8, pp. 137-142.
Final office action in relation to U.S. Appl. No. 10/913,694, dated Oct. 18, 2010.
Notice of Abandonment in relation to U.S. Appl. No. 10/913,694, dated Jun. 14, 2011.
Nakajima, Tatsuo et al.,: "Adaptive Continuous Media Applications in Mobile Computing Environments", Multimedia Computing and Systems '97 Proceedings, IEEE International Conference on Ottawa, Ont. Canada, Jun. 3, 1997, pp. 152-160, XP010239184.
Office Action in relation to U.S. Appl. No. 12/194,768, dated May 6, 2011.
Response to Office Action in relation to U.S. Appl. No. 12/194,768, dated Jul. 29, 2011.
Final office action in relation to U.S. Appl. No. 12/194,768, dated Oct. 20, 2011.
Response to Office Action in relation to U.S. Appl. No. 12/194,768, dated Dec. 12, 2011.
Advisory Action in relation to U.S. Appl. No. 12/194,768, dated Dec. 27, 2011.
Co-pending U.S. Appl. No. 13/483,216, "System and Method for Searching and Retrieving Certificates", filed May 30, 2012.
Office Action in relation to U.S. Appl. No. 12/645,003, dated Sep. 30, 2011.
Response to Office Action in relation to U.S. Appl. No. 12/645,003, dated Dec. 30, 2011.
Canadian Patent Application No. 2,592,680, dated Jan. 4, 2011.
Notice of Allowance in relation to Canadian Patent Application No. 2,592,680, dated Nov. 22, 2011.
Examination Report in relation to European patent Application No. 06253267.6, dated Oct. 2, 2011.
Russell, S.: "Fast Checking of Individual Certificate Revocation on Small Systems"; Computer Security Applications Conference, Pheonix, AZ, Dec. 6, 1999, pp. 249-155, XP010368617—7pgs.
U.S. Appl. No. 10/913,694, dated Oct. 25, 2007.
Response to Office Action in relation to U.S. Appl. No. 10/913,694, dated Apr. 25, 2008.
Final Office Action in relation to U.S. Appl. No. 10/913,694, dated Jul. 29, 2008.
Office Action in relation to U.S. Appl. No. 10/913,694, dated Sep. 29, 2008.
Advisory Action in relation to U.S. Appl. No. 10/913,694 dated Oct. 17, 2008.
Response to Office Action in relation to U.S. Appl. No. 10/913,694, dated Nov. 27, 2008.
Amendment in relation to U.S. Appl. No. 10/913,694, dated Dec. 19, 2008.
Office Action in relation to U.S. Appl. No. 10/913,694, dated Mar. 4, 2009.
Office Action in relation to U.S. Appl. No. 10/913,694, dated Jun. 3, 2009.
Final Office Action in relation to U.S. Appl. No. 10/913,694, dated Sep. 17, 2009.
Response to Office Action in relation to U.S. Appl. No. 10/913,694, dated Jan. 18, 2010.
Stallings, W.: "S/MIME: E-Mail Gets Secure", Byte, McGraw-Hill Inc., St. Peterborough, US vol. 23, No. 7, Jul. 1998, pp. 41-42, XP000774260.
Crocker, S. et al.: "MIME Object Security Services; rfc1848.text", IETF Standard, Internet Engineering Task Force, IETF, CH, Oct. 1995, XP015007633.
Katsuro Inaya et al., Imakoso Isukau Windows CE (time to use Windows CE), Monthly ASCII, Oct. 1, 1999, vol. 23, No. 10, pp. 266-285.
Sawano, Hiroyuki, Create a Secure Electronic Mail Environment with S/MIME!, @IT Security & Trust, May 30, 3001, URL: http://www.atmarkit.co.jp/fsecurity/speacial/04smime/smime01.html.
Blom et al. "Conversational IP Multimedia Security", 4th International Workshop on Mobile and Wireless Communications Network, Sep. 9-11, 2002, pp. 147-151.
Fumy et al. Principles of Key Management, IEEE Journal on Selected Areas in Communications, VDI, 11, No. 5, Jun. 1993, pp. 785-793.
Eskicioglu et al. "A Key Transport Protocol Based in Secret Sharing Applications to Information Security", IEEE Transactions on Consumer Electronics, vol. 48, No. 4, Nov. 2002, pp. 816-824.
Kotzanikolaou et al., "Hybrid Key Establishment for Multiphase Self-Organized Sensor Networks", 6th IEEE International Sympsium on a World of Wireless Mobile and Multimedia Networks, Jun. 13-16, 2005, pp. 581-587.
Research in Motion Limited, Blackberry Security White Paper Release 4.0 2005 Internet Address: http://blackberry.com/knowledgecenterpublic/livelink.exe?func=II&objId=S2S044&objAction=browse&sort=name.
Kiely, Don, SQL Server 2005 Secures Your Data Like Never Before, Sep. 29, 2005. Internet Address: http://www.devx.com/codernag/Article/29351?trk=DXRSS_DB.
Lai, "A mobile subscriber proxy preserving writer-to-reader message security," Military Communications Conference, Milcorn '96, Conference Proceedings, IEEE McLean, VA, USA Oct. 21-24, 1996, New York, NY, USA, IEEE, pp. 461-467 (Oct. 21, 1996).
Schumacher: "AutoPGP FAQ, Version 1", Internet Newsgroup, 'Online! (Apr. 19, 1994), XP002230742.

Levien, R.: "Protecting Internet E-Mail From Pryong Eyes", Data Communications, McGraw-Hill. New York, US. vol. 25, No. 6 (May 1, 1996), pp. 117-118, 120, 122, XP000587586.
Butrico, M. et al.: "Enterprise Data Access from Mobile Computers: An End-to-endStory", Research Issues in Data Engineering, Feb. 28, 2000, pp. 9-16, XP010377083—8 pages.
Deroest, J.: "Ubiquitous Mobile Computing", Sunexpert Magazine: Jul. 1998, pp. 54-56, XP002213003—pgs.
Jing, Jin et al., "Client-server Computing in Mobile Environments", ACM Computing Surveys: Jun. 1999, vol. 31, No. 2, pp. 117-157, XP002212945—41 pgs.
Wasley, D.L.: "Improving Digital Credential Management in Browsers", Internet Article, Jul. 21, 2000, pp. 1-8, XP002213004—9 pages.
Brown, Ian. Et al., "A Proxy Approach to E-mail Security," Software Practice & Experience, John Wiley & Sons Ltd. Chichester, GB, vol. 29, No. 12, pp. 1049-1060 (Oct. 1999).
Response. European Application No. 06253267.6. Dated: Aug. 23, 2007.
Response. European Application No. 06253267.6. Dated: Aug. 27, 2009.
Response. European Application No. 06253267.6. Dated: May 26, 2011.
Office Action. Canadian Application No. 2,592,680. Dated: Jan. 4, 2011.
Office Action. Co-pending U.S. Appl. No. 13/483,216. Dated: Feb. 25, 2013.
Wasley, D.L: "Improving Digital Credential Management in Browsers", Internet Article, Jul. 21, 2000, pp. 1-8, XP002213004—9 pages.
Brown, et al., "PGP in Constrained Wireless Devices," Proceedings of 9th Unisex Security Symposium, Denver, CO, USA, pp. 247-261 (Aug. 14-17, 2000).
Cole, "An Architecture for a Mobile OSI Mail Access System," IEEE Journal on Selected Areas in communications, IEEE Inc., New York, USA, vol. 7, No. 2, pp. 249-256 (Feb. 1989).
Dusse, "S/MIME Version 2 Message Specification," The Internet Society, pp. 1-37 (Mar. 1998).
Gong, "Multicast Security and its Extension to a Mobile Environment," Wireless Networks 1, J.C. Baltzer AG, Science Publishers, pp. 281-295 (1995).
Harris, "Content Privacy and content Security Working Together," Internet Article, content technologies White Paper, pp. 1-10 (Sep. 1999).
Mambo, "Proxy Signatures: Delegation of the Power to Sign Messages," IEICE Transactions on Fundamentals of Electronics, Communications and computer Sciences, IEICE Tokyo, Japan, vol. E790-A, No. 9, pp. 1338-1353 (Sep. 1, 1996).
Subramanyam, "Security in Mobile Systems," Reliable Distributed Systems, 1998 Proceedings, 17th IEEE Symposium on W. Lafayette, IN, USA. Oct. 20-23, 1998, Los Alamitos, CA, USA, May 6-8, 1996, Los Alamitos, CA, USA, IEEE Comput. Soc., USA, pp. 407-412 (Oct. 20, 1998).
Syverson, "Limitations on Design Principles for Public Key Protocols," Security and Privacy, 1996, Proceedings, 1996 IEEE Symposium on Oakland, CA, USA, May 6-8, 1996, Los Alamitos, CA, USA, IEEE comput. Soc., USA, pp. 62-72 (May 6, 1996).
Torvinen, "Wireless PKI: Fundamentals," Internet Article, Radiocchio White Paper, pp. 1-15 (2000).
Hoffman: "Enhanced Security Services for S/MIME", Database IETF RFC 2634, Jun. 1999, pp. 1-58 (Chapter 3, pp. 24-32), XP002220386.
Co-pending U.S. Appl. No. 13/613,069, "System and Method for Enabling Bulk Retrieval of Certificates", filed Sep. 13, 2012.
Amendment in relation to U.S. Appl. No. 10/913,693, dated Nov. 11, 2004.
Zollner J.: "Gateway to Overcome Incompatibilities of Security mechanisms" Reliable Distributed Systems, 1999. Proceedings of the 19th IEEE Symposium on Lausanne, Switzerland Oct. 19-22, 1999, Los Alamitos, Cal, USA, IEEE Compu. Soc. US Oct. 19, 1999, pp. 372, 377, XP 010357040 ISBN: 978-0-7695-0290-8.
Amendment in relation to U.S. Appl. No. 10/913,693, dated Aug. 19, 2008.
Hametvaara, Vesa, "certificate Management in Mobile Devices", May 2002.
Hously, R. et al., "Internet X.509 Public Key Infrastructure Certificate and CRL Profile (RFC 2459)", Jan. 1999.
Myers, M. et al., "Certificate Management Messages over CMS (RFC2797)", Apr. 2000.
Office Action in relation to U.S. Appl. No. 10/913,693, dated Sep. 21, 2007.
Response to Office Action in relation to U.S. Appl. No. 10/913,693, dated Feb. 20, 2008.
Notice of Allowance dated May 20, 2008, and Amendment after Allowance dated Aug. 19, 2008, in relation to U.S. Appl. No. 10/913,693.
Final Office Action in relation to U.S. Appl. No. 10/913,694, dated Apr. 5, 2010.
European Examination Report dated Mar. 18, 2009, European Patent application No. 06253267.6.
Dusse, et al.: "S/MIME Version 2 Certificate handling", Database IETF RFC Online IETF: RFC 2312, Mar. 1998, pp. 1-20 (Chapter 2.1, Chapter 4.1), XP0022220385.
Office Action in relation to U.S. Appl. No. 10/931,983 dated Nov. 13, 2007.
Response to Office Action in relation to U.S. Appl. No. 10/931,983, dated Mar. 12, 2008.
Office Action in relation to U.S. Appl. No. 10/931,983, dated Jul. 15, 2008.
Response to Office Action in relation to U.S. Appl. No. 10/931,983, dated Sep. 15, 2008.
Office Action in relation to U.S. Appl. No. 10/931,983, dated Dec. 16, 2008.
Response to Office Action in relation to U.S. Appl. No. 10/931,983, dated Mar. 11, 2009.
Interview Summary dated Jul. 2, 2009, U.S. Appl. No. 10/931,983.
Notice of Allowance in relation to U.S. Appl. No. 10/931,983, dated Jul. 9, 2009.
International Search Report App. No. EP 06 25 3267, dated Jan. 22, 2007.
"BlackBerry with the S/MIME Support Package Version 4.0 User Guide Supplement", URL: http://www.blackberry.com/knowledgecenterpublic/livelink.exe/fetch/2000/8067/645045/8533/348781/1181993/S_MIME_Support_Package_version_4.0_User_Guide_Supplement?nodeid=1181919&vernum=0>, Dec. 4, 2006, paragraphs0001-0005, XP002410691.
ITU-T "Information Technology—Open Systems Interconnection—The Directory: Public Key and Attribute Certificate Frameworks", Mar. 2000.
Chadwick, D.W., et al., "Modifying LDAP to Support X.509-based PKIs", In Seventeenth Annual IFIP WG 11.3 Working Conference on Database and Application Security at Estes Park, Colorado, Aug. 2003.
Research in Motion Limited, BlackBerry Security with the S/MIME Support Package version 1.5 Dec. 17, 2003.
Ramsdell, D. et al., "Secure/Multipurpose Internet Mail Extensions (S/MIME) Version 3.1 Certificate handling (RFC 3850)", Jul. 2004.
Amendment in relation to U.S. Appl. No. 10/913,694, dated Aug. 5, 2010.
Myers, M. et al., X.509 Internet Public Key Infrastructure Online Certificate Status Protocol—OCSP, RFC2560 (Jun. 1999).
Berson T. et al. "Cryptography as a network service" 8th Annual Symposium on Network and Distributed System Security. (NDSS'01) Internet Soc Reston, VA, USA, Feb. 7-9, 2001, pp. 1-12, XP002551706.

* cited by examiner

FIG. 9

Default
- Security Policy Group
- SMIME Application Policy Grou
- PGP Application Policy Group
- Memory Cleaner Policy Group
- TLS Application Policy Group
- WTLS Application Policy Group
- Browser Policy Group
- SIM Application Toolkit
- TCP Policy Group
- PIM Sync Policy Group
- Bluetooth Policy Group
- VoIP Policy Group
- Smart Dialing Policy Group
- VPN Policy Group
- WLAN Policy Group
- On-Device Help Policy Group
- Bluetooth Smart Card Reader
- MDS Policy Group
- Secure Email Policy Group
- Desktop Policy Group
- Service Exclusivity Policy Grou
- Certificate Snyc Policy Group
- BlackBerry Messenger Policy G
- User Defined Items

| Disable Certificate Address Checks | |
|---|---|
| Canonical Certificate Domain Name | agency.gov |

Canonical Certificate Domain Name
Specify the domain name that is used for the email addresses contained in certificates issued within the organization. This rule is intended for use in organizations where users' certificates contain a long-lived email address but they typically send email from a shorter-lived email address with the

[ OK ]  [ Cancel ]  [ Apply ]

SYSTEM AND METHOD FOR HANDLING ELECTRONIC MAIL MISMATCHES

CROSS-REFERENCE TO RELATED APPLICATIONS

This application is a continuation of prior U.S. patent application Ser. No. 12/896,224, filed on Oct. 1, 2010 and issued to patent as U.S. Pat. No. 8,312,165 which is a continuation of prior U.S. patent application Ser. No. 11/473,313, filed on Jun. 23, 2006, which has issued to U.S. Pat. No. 7,814,161. The entire contents of U.S. patent application Ser. No. 11/473,313 and U.S. patent application Ser. No. 12/896,224 are hereby incorporated by reference.

TECHNICAL FIELD

The present disclosure relates generally to the processing of secure electronic messages and information. In particular, the instant disclosure is directed to a system and method for resolving mismatches that may occur between, for example, an e-mail address contained in the certificate of a sender or recipient of an electronic message, and the e-mail address actually used in the sender or recipient field of an e-mail.

RELATED ART

Exchanging secured electronic messages and data, such as, for example, e-mail messages, is well known. Secure electronic messaging may involve the use of digital signatures, encryption, or the like. For example, a recipient of an electronic message may verify that the sender of an electronic message is trusted by comparing the address of the sender to an address that may be contained in a certificate or certificate chain of the sender.

Some organizations, such as, for example, government agencies like the Department of Defense, are moving to systems in which a user has an e-mail address that they will keep for the life of their tenure with that organization. This sort of lifelong address will typically be contained within the user's certificate. As a user moves around within the organization, the address for their account may change, for example, based on location. For example, the lifelong address may appear as John.Doe@agency.gov, while the address being used when the user is working at a particular site within the organization may change to reflect the location of the user, for example, John.Doe@locationA.agency.gov. Thus, in this example, as John Doe moves about throughout the agency, the lifelong address of John Doe will not change, but John Doe's outlook address may change based on John Doe's location.

This arrangement can create many problems with signed electronic messages, such as, for example, S/MIME, because it depends on the e-mail address found in the user's certificate matching the e-mail address of the account for verification. In this example, if someone wants to send an e-mail to John Doe when he is stationed at location A, the system would search for the certificate containing the address John.Doe@locationA.agency.gov, but the address contained in John Doe's lifelong certificate is John.Doe@agency.gov. This difference will result in a mismatch. Similarly, if John Doe were to send a signed e-mail to someone, when the recipient attempts to verify it, the recipient will see the originating address is John.Doe@locationA.agency.gov, but the address in the certificate is John.Doe@agency.gov. Again, this will result as an e-mail mismatch error.

What is needed is a system and method for resolving the potential mismatch errors, for example, those that might occur in organizations that use lifelong e-mail addresses and shorter term addresses that are used as the user moves around within the organization.

BRIEF DESCRIPTION OF THE DRAWINGS

These and other objects and advantages of exemplary embodiments of the present invention will be better understood and appreciated in conjunction with the following detailed description of exemplary embodiments taken together with the accompanying drawings, in which:

FIG. 9 is an exemplary screen shot illustrating an exemplary administrator screen that may be used to assign a generic or canonical name to a user's certificate.

DETAILED DESCRIPTION OF EXEMPLARY EMBODIMENTS

Figure 1:
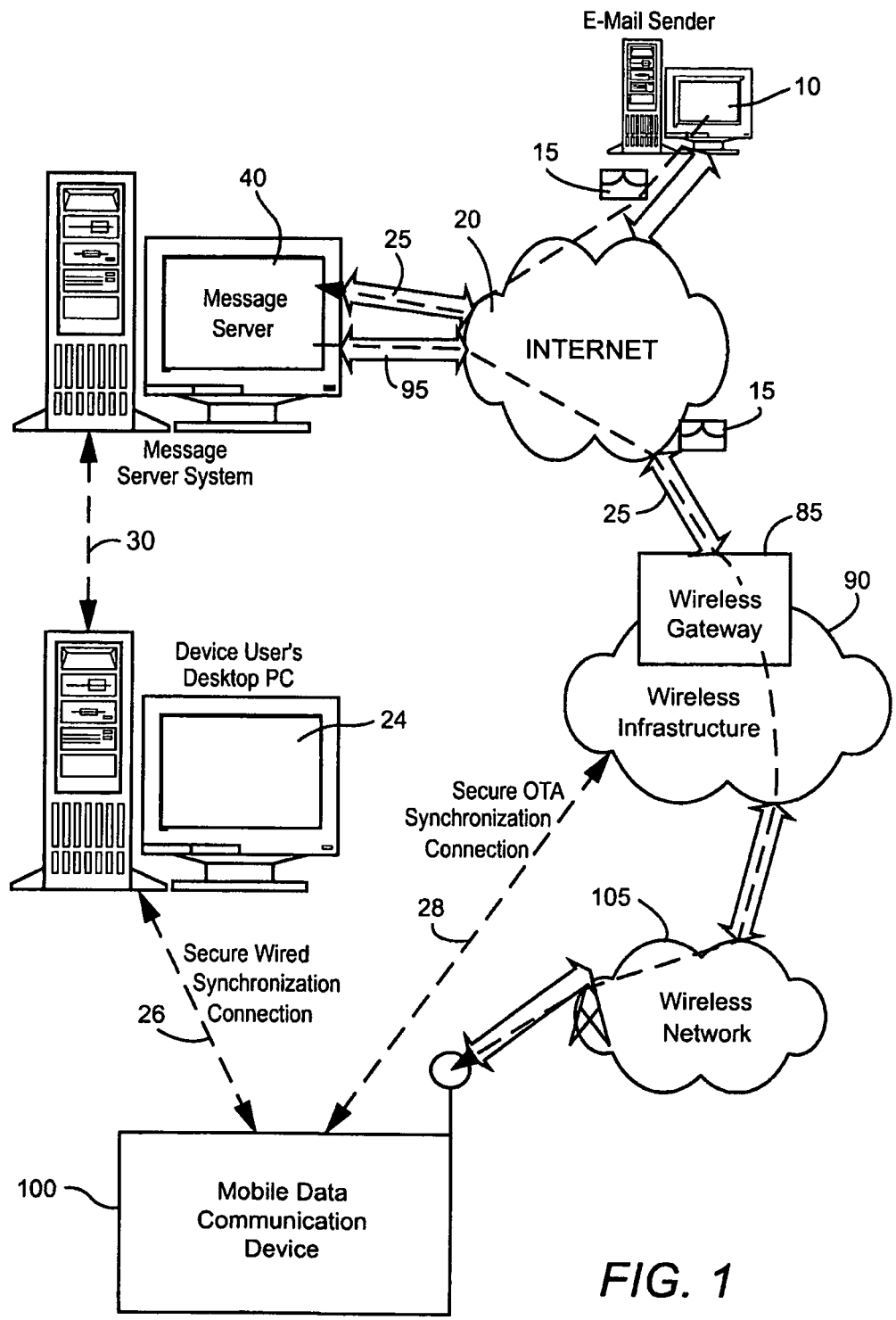
FIG. 1 is an overall system wide schematic view of an exemplary wireless e-mail communication system incorporating a mobile wireless communications device in accordance with an exemplary embodiment of the present invention.

In view of the foregoing, we have now identified an efficient, accurate and easy to implement system and method for handling e-mail address mismatches between the address contained within a user's certificate or certificate chain, and the account address actually being used. In order to resolve address mismatches one or more canonical, e.g., generic, domain name(s) may, for example, be used as a lifelong address of a user that is contained in the user's certificate. Upon detection of an address mismatch, the system and method disclosed herein may automatically re-check the certificate or search for a certificate containing the canonical or generic domain or user name to attempt to resolve the mismatch. This mismatch resolution is preferably transparent to the user and occurs automatically. The canonical or generic domain or user names that are available to the device may be typically controlled by IT policy that is in place on the system for the device. While this system is suitable for any type of electronic messaging system, it has particular applicability to systems that use mobile wireless communication devices with electronic messaging capability.

According to an exemplary embodiment, if a search for a recipient's certificate, or when performing an address mismatch check when receiving a signed message, a canonical or generic domain name may be included in the search. Thus, if someone is trying to send an e-mail to John.Doe@locationA.agency.gov, and a matching certificate is not found, the search may be retried using a canonical or generic domain name, such as, for example, John.Doe@agency.gov. The system may be preferably configured to automatically retry a certificate search of a recipient using the canonical or generic domain name, or in the case of an address mismatch when attempting to verify a received message, retry the check substituting the canonical or generic domain name(s). A faster and perhaps even more efficient approach when searching for a certificate or attempting to resolve a mismatch, is to automatically check certificates for both the address of the account being used and canonical or generic domain name simultaneously, and transparently provide the user with the matching result. While it is preferred in this example to perform these certificate checks at the device level, it is also envisioned that a server or service resident on a server within the system, such as, for example, an e-mail server may perform these checks thereby increasing the speed and efficiency of the search, while alleviating processor overhead of the device. As with the device, a server-based implementation, the canonical or generic domain names that are available to the device via the server may be typically controlled by IT policy that is in place on the system.

According to another exemplary embodiment, the system may be configured to search for a generic name that includes canonical or generic user name(s) in place of (or in addition to) a canonical or generic domain name to search for a certificate or to resolve a mismatch. Typically, e-mail addresses are composed of two main parts—the user name and the domain name, for example, user name@domain name. The examples set forth above are described with respect to using a canonical or generic domain name when searching for a certificate or when attempting to resolve a mismatch. However, it is also contemplated that a canonical or generic user name may be used to search for a certificate or resolve a mismatch. For example, the user name may change as an employee moves or is assigned to different departments within an agency. For instance, the lifelong address may be John.Doe@agency.gov, but the user name may change as John Doe is assigned to different offices or departments within the agency, for example, John. Doe_Legal@agency.gov,
John. Doe_accounting@agency.gov,
John.Doe_Solicitor@agency.gov, etc.

In this example, to search for a certificate or to resolve a mismatch, the system may utilize a canonical or generic user name, e.g., by truncating the portion of the user name following the underscore in the examples set forth above. The system administrator would be able to set the rules for using canonical or generic user names or domain names based on the structure of the address via IT policy.

In yet a further exemplary implementation, using a combination of canonical or generic domain names and user names to search for a certificate or to resolve a mismatch may also be used to provide a more robust solution.

FIG. 1 is an overview of an example communication system in which a wireless communication device may be used. One skilled in the art will appreciate that there may be hundreds of different topologies, but the system shown in FIG. 1 helps demonstrate the operation of the encoded message processing systems and methods described in the present application. There may also be many message senders and recipients. The simple system shown in FIG. 1 is for illustrative purposes only, and shows perhaps the most prevalent Internet e-mail environment where security is not generally used.

FIG. 1 shows an e-mail sender 10, the Internet 20, a message server system 40, a wireless gateway 85, wireless infrastructure 90, a wireless network 105 and a mobile communication device 100.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Perhaps the two most common message servers are Microsoft Exchange™ and Lotus Domino™.

These products are often used in conjunction with Internet mail routers that route and deliver mail. These intermediate components are not shown in FIG. 1, as they do not directly play a role in the secure message processing described below. Message servers such as server 40 typically extend beyond just e-mail sending and receiving; they also include dynamic database storage engines that have predefined database formats for data like calendars, to-do lists, task lists, e-mail and documentation.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile device 100 via wireless transmission, typically at a radio frequency (RF), from a base station in the wireless network 105 to the mobile device 100. The particular network 105 may be virtually any wireless network over which messages may be exchanged with a mobile communication device.

As shown in FIG. 1, a composed e-mail message 15 is sent by the e-mail sender 10, located somewhere on the Internet 20. This message 15 is normally fully in the clear and uses traditional Simple Mail Transfer Protocol (SMTP), RFC822 headers and Multipurpose Internet Mail Extension (MIME) body parts to define the format of the mail message. These techniques are all well known to those skilled in the art. The message 15 arrives at the message server 40 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment described in further detail below, messages addressed to a message server account associated with a host system such as a home computer or office computer which belongs to the user of a mobile device 100 are redirected from the message server 40 to the mobile device 100 as they are received.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/IP protocol used throughout the Internet. As used herein, the term "wireless network" is intended to include at least one of three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE), integrated Digital Enhanced Network (iDEN), Evolution Data Optimized (EvDO), High-Speed Downlink Packet Access (HSDPA), Universal Mobile Telecommunications Systems (UMTS) or the like. Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
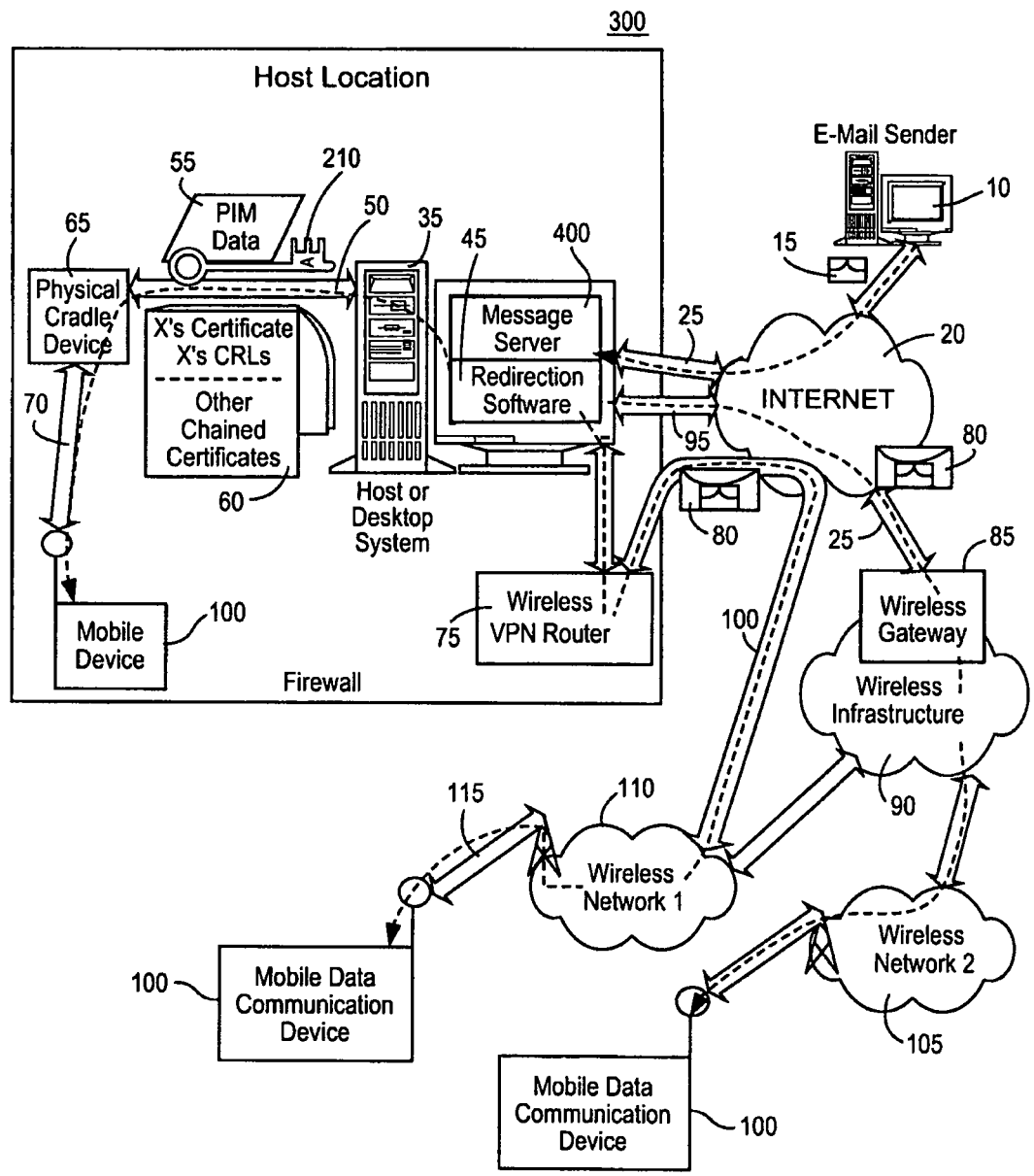
FIG. 2 is a block diagram of a further exemplary communication system including multiple networks and multiple mobile communication devices.

FIG. 2 is a block diagram of a further example communication system including multiple networks and multiple mobile communication devices. The system of FIG. 2 is substantially similar to the FIG. 1 system, but includes a host system 300, a redirection program 45, a mobile device cradle 65, a wireless virtual private network (VPN) router 75, an additional wireless network 110 and multiple mobile communication devices 100. As described above in conjunction with FIG. 1, FIG. 2 represents an overview of a sample network topology. Although the encoded message processing systems and methods described herein may be applied to networks having many different topologies, the network of FIG. 2 is useful in understanding an automatic e-mail redirection system mentioned briefly above.

The central host system 300 will typically be a corporate office or other LAN, but may instead be a home office computer or some other private system where mail messages are being exchanged. Within the host system 300 is the message server 400, running on some computer within the firewall of the host system, that acts as the main interface for the host system to exchange e-mail with the Internet 20. In the system of FIG. 2, the redirection program 45 enables redirection of data items from the server 400 to a mobile communication device 100. Although the redirection program 45 is shown to reside on the same machine as the message server 400 for ease of presentation, there is no requirement that it must reside on the message server. The redirection program 45 and the message server 400 are designed to co-operate and interact to allow the pushing of information to mobile devices 100. In this installation, the redirection program 45 takes confidential and non-confidential corporate information for a specific user and redirects it out through the corporate firewall to mobile devices 100. A more detailed description of the redirection software 45 may be found in the commonly assigned U.S. Pat. No. 6,219,694 ("the '694 patent"), entitled "System and Method for Pushing Information From A Host System To A Mobile Data Communication Device Having A Shared Electronic Address", and issued to the assignee of the instant application on Apr. 17, 2001 which is hereby incorporated into the present application by reference. This push technique may use a wireless friendly encoding, compression and encryption technique to deliver all information to a mobile device, thus effectively extending the security firewall to include each mobile device 100 associated with the host system 300.

As shown in FIG. 2, there may be many alternative paths for getting information to the mobile device 100. One method for loading information onto the mobile device 100 is through a port designated 50, using a device cradle 65. This method tends to be useful for bulk information updates often performed at initialization of a mobile device 100 with the host system 300 or a computer 35 within the system 300. The other main method for data exchange is over-the-air using wireless networks to deliver the information. As shown in FIG. 2, this may be accomplished through a wireless VPN router 75 or through a traditional Internet connection 95 to a wireless gateway 85 and a wireless infrastructure 90, as described above. The concept of a wireless VPN router 75 is new in the wireless industry and implies that a VPN connection could be established directly through a specific wireless network 110 to a mobile device 100. The possibility of using a wireless VPN router 75 has only recently been available and could be used when the new Internet Protocol (IP) Version 6 (IPV6) arrives into IP-based wireless networks. This new protocol will provide enough IP addresses to dedicate an IP address to every mobile device 100 and thus make it possible to push information to a mobile device 100 at any time. A principal advantage of using this wireless VPN router 75 is that it could be an off-the-shelf VPN component, thus it would not require a separate wireless gateway 85 and wireless infrastructure 90 to be used. A VPN connection would preferably be a Transmission Control Protocol (TCP)/IP or User Datagram Protocol (UDP)/IP connection to deliver the messages directly to the mobile device 100. If a wireless VPN 75 is not available then a link 95 to the Internet 20 is the most common connection mechanism available and has been described above.

In the automatic redirection system of FIG. 2, a composed e-mail message 15 leaving the e-mail sender 10 arrives at the message server 400 and is redirected by the redirection program 45 to the mobile device 100. As this redirection takes place the message 15 is re-enveloped, as indicated at 80, and a possibly proprietary compression and encryption algorithm can then be applied to the original message 15. In this way, messages being read on the mobile device 100 are no less secure than if they were read on a desktop workstation such as 35 within the firewall. All messages exchanged between the redirection program 45 and the mobile device 100 preferably use this message repackaging technique. Another goal of this outer envelope is to maintain the addressing information of the original message except the sender's and the receiver's address. This allows reply messages to reach the appropriate destination, and also allows the "from" field to reflect the mobile user's desktop address. Using the user's e-mail address from the mobile device 100 allows the received message to appear as though the message originated from the user's desktop system 35 rather than the mobile device 100.

With reference back to the port 50 and cradle 65 connectivity to the mobile device 100, this connection path offers many advantages for enabling one-time data exchange of large items. For those skilled in the art of personal digital assistants (PDAs) and synchronization, the most common data exchanged over this link is Personal Information Management (PIM) data 55. When exchanged for the first time this data tends to be large in quantity, bulky in nature and requires a large bandwidth to get loaded onto the mobile device 100 where it can be used on the road. This serial link may also be used for other purposes, including setting up a private security key 111 such as an S/MIME or PGP specific private key, the Certificate (Cert) of the user and their Certificate Revocation Lists (CRLs) 60. The private key is preferably exchanged so that the desktop 35 and mobile device 100 share one personality and one method for accessing all mail. The Cert and CRLs are normally exchanged over such a link because they represent a large amount of the data that is required by the device for S/MIME, PGP and other public key security methods. However, there are situations where a user does not have the ability to establish such a link to their desktop 35 in order to update the key store of the mobile device 100 with the appropriate private keys. In these situations, the system and method described herein allow the secure transfer of cryptographic information over a wireless link.

Figure 3:
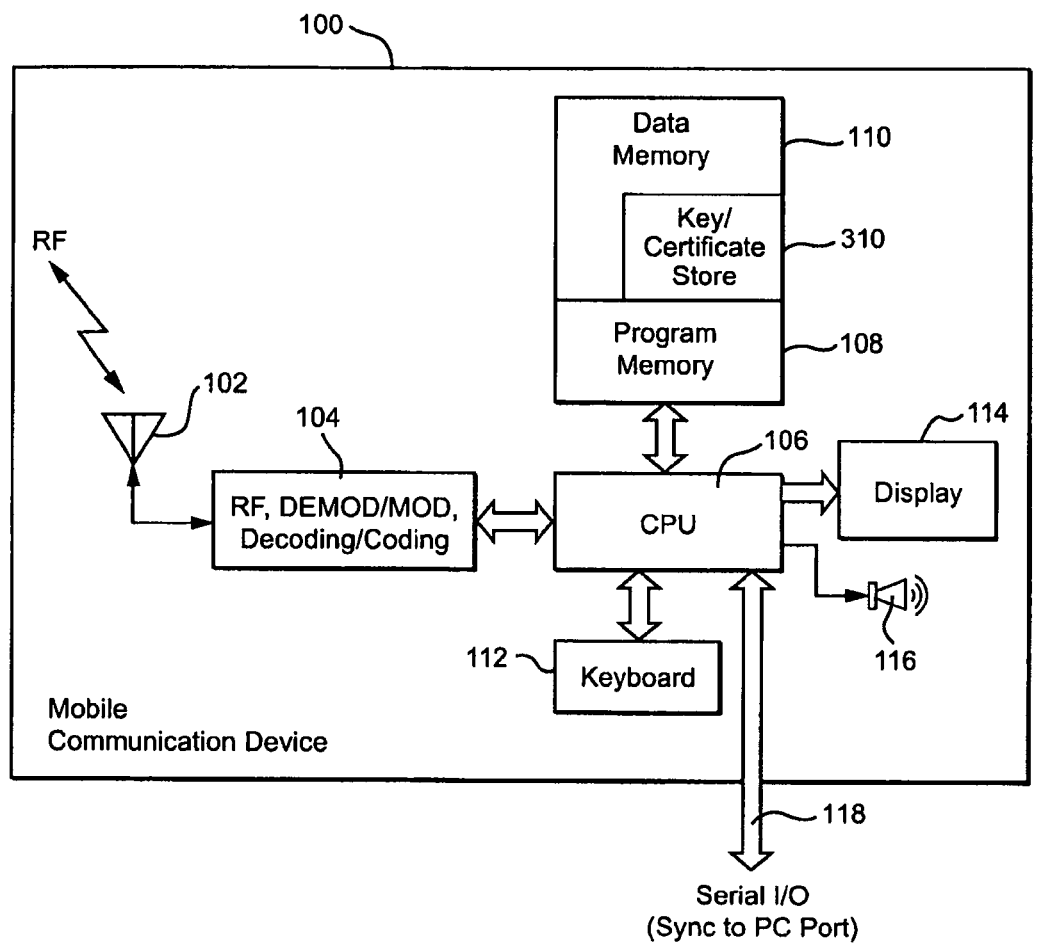
FIG. 3 is an abbreviated schematic diagram of hardware included within an exemplary mobile wireless communications device.

As depicted in FIG. 3, mobile communications device 100 includes a suitable RF antenna 102 for wireless communication to/from wireless network 20. Conventional RF, demodulation/modulation and decoding/coding circuits 104 are provided. As those in the art will appreciate, such circuits may involve possibly many digital signal processors (DSPs), microprocessors, filters, analog and digital circuits and the like. However, since such circuitry is well known in the art, it is not further described herein.

The mobile communications device 100 will also typically include a main control CPU 106 that operates under the control of a stored program in program memory 108, and which has access to data memory 110. CPU 106 also communicates with a conventional keyboard 112 and display 114 (for example, a liquid crystal display or LCD) and audio transducer or speaker 116. A portion of the data memory 310 is available for storing data required for decrypting encrypted messages, such as, for example, private keys, digital certificates, and the like. Suitable computer program executable code is stored in portions of the program memory 108 to constitute stored program logic for receiving and using new or added private keys and/or digital certificates or the like as described below (for example, via a wired serial I/O port or the wireless RF antenna 102).

As depicted in FIG. 1, a secure wired synchronization connection 26 (for example, between serial I/O ports of the user's base unit 24 and the wireless device 100) is typically provided for normal data synchronization purposes (for example, to synchronize databases in the two devices with respect to such things as calendars, to-do lists, task lists, address books, etc.). Part of prior data synchronization processes has included a program logic such as Cert Sync for maintaining synchronization between cryptographic message certificates. If a secure over the air (OTA) synchronization connection 28 is available, it may also be used by Cert Sync to maintain synchronization of cryptographic message certificates.

As previously described, there is a communications link (for example, depicted in dotted lines at 20 in FIG. 1) typically found between the device user's base unit 24 and a system message server 14. Accordingly, there is an existing communication path that may be utilized for passing synchronization data from the user's base unit 24 via channel 30, the server 14, Internet 12, wireless gateway 16 and wireless infrastructure 18 via the OTA synchronization connection 28.

Figure 4:
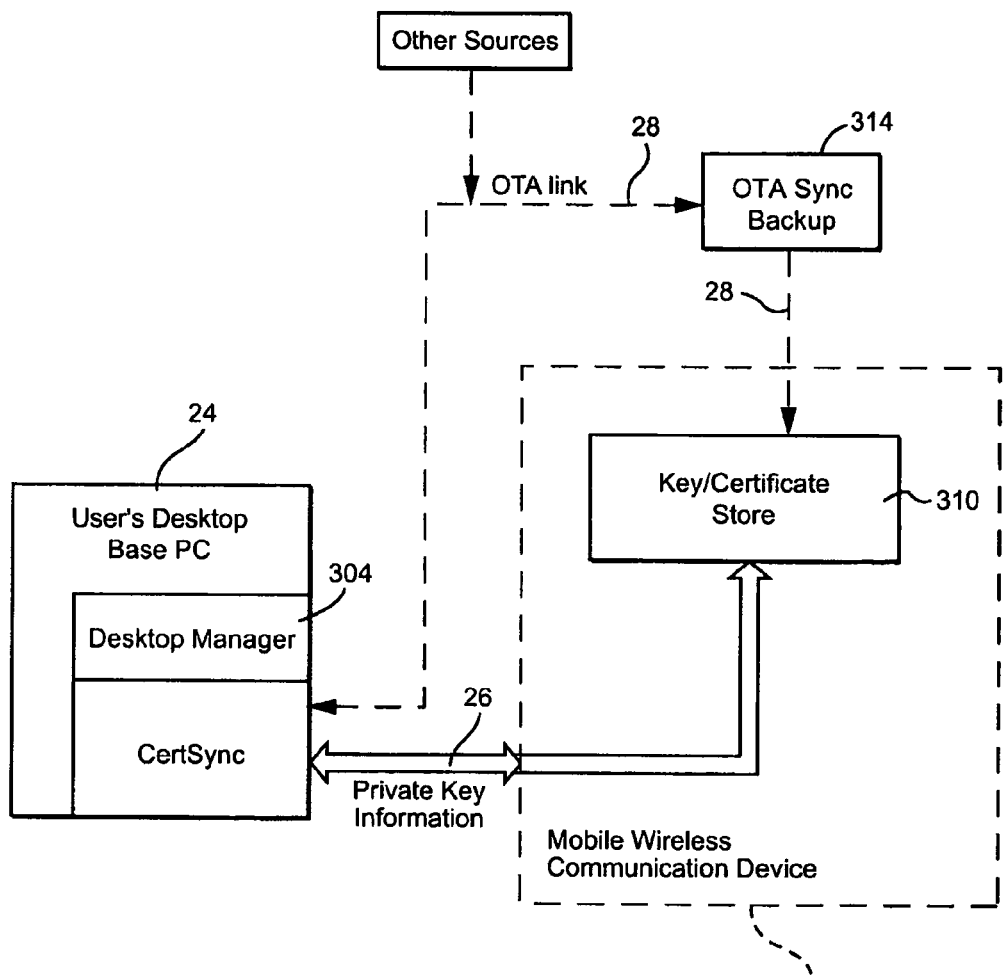
FIG. 4 is an abbreviated schematic functional diagram of the hardware/software utilized in an exemplary mobile wireless communication device in the exemplary embodiment of FIG. 1.

As depicted in FIG. 4, the user's base unit 24 may be used to update the mobile wireless communications device 100 with information including, for example, private key information and digital certificate information. The user's base station 24 is typically a desktop PC, and may be of conventional hardware and operating system design. It will typically include desktop manager program logic 304 (in the form of, for example, executable computer program logic) for managing, among other things, a normal data synchronization connection to device 100. As previously mentioned, in the environment of mobile wireless communications systems, such a desktop manager may typically include logic for synchronizing cryptographic message certificates. Such logic is denoted here as Cert Sync.

E-mail messages generated using the S/MIME and PGP techniques may include encrypted information, a digital signature on the message contents, or both. In signed S/MIME operations the sender takes a digest of a message and signs the digest using the sender's private key. A digest is essentially a checksum, CRC or other preferably non-reversible operation such as a hash of the message, which is then signed. The signed digest is appended to the outgoing message, possibly along with the certificate of the sender and possibly any required certificates or CRLs. The receiver of this signed message must also take a digest of the message, compare this digest with the digest appended to the message, retrieve the sender's public key, and verify the signature on the appended digest. If the message content has been changed, the digests will be different or the signature on the digest will not verify properly. If the message is not encrypted, this signature does not prevent anyone from seeing the contents of the message, but does ensure that the message has not been tampered with and is from the actual person as indicated on the "from" field of the message.

The receiver may also verify the certificate and CRL if they were appended to the message. A certificate chain is a certificate along with a number of other certificates required to verify that the original certificate is authentic. While verifying the signature on a signed message, the receiver of the message will also typically obtain a certificate chain for the signing certificate and verify that each certificate in the chain was signed by the next certificate in the chain, until a certificate is found that was signed by a root certificate from a trusted source, such as, for example, a large Public Key Server (PKS) associated with a Certificate Authority (CA), such as, for example, Verisign or Entrust, both prominent companies in the field of public key cryptography. Once such a root certificate is found, a signature can be verified and trusted, since both the sender and receiver trust the source of the root certificate.

In encrypted S/MIME message operations, a one-time session key is generated and used to encrypt the body of the message, typically with a symmetric cipher, such as, for example, Triple DES. The session key is then encrypted using the receiver's public key, typically with a public key encryption algorithm like RSA. If the message is addressed to more than one receiver, the same session key is encrypted using the public key of each receiver. The encrypted message body, as well as all encrypted session keys, is sent to every receiver. Each receiver must then locate its own session key, possibly based on a generated Recipient Info summary of the receivers that may be attached to the message, and decrypt the session key using its private key. Once the session key is decrypted, it is then used to decrypt the message body. The S/MIME Recipient Info attachment can also specify the particular encryption scheme that must be used to decrypt the message. This information is normally placed in the header of the S/MIME message. Those skilled in the art will appreciate that these operations relate to an illustrative example of SIMIME messaging and its associated encoding operations, namely encryption. It will also be understood that the instant disclosure is in no way limited thereto.

Figure 5:
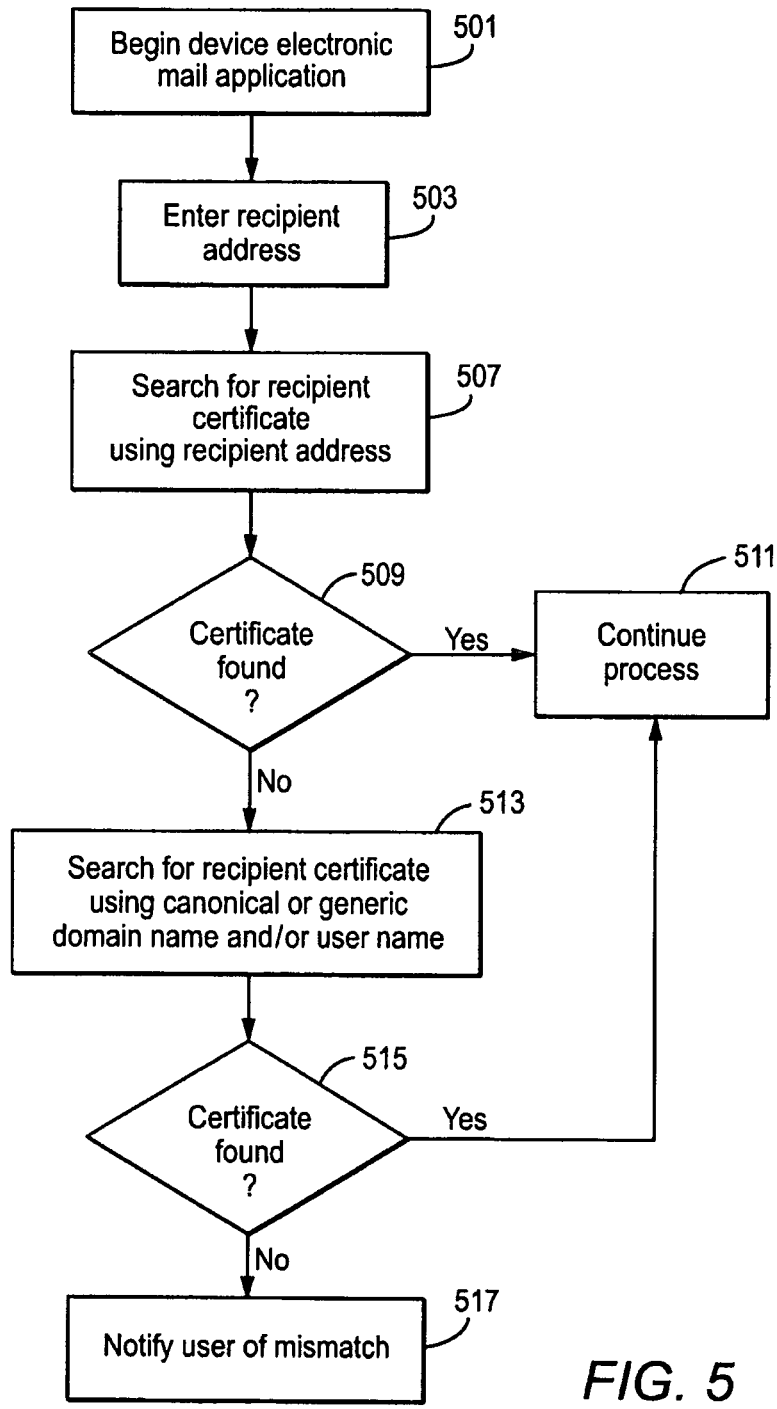
FIG. 5 is an exemplary abbreviated flow diagram of a method used in a system for handling electronic mail mismatches in a recipient address.

FIG. 5 is an exemplary abbreviated flow diagram of a method for use in a system for handling electronic mail mismatches when searching for a recipient's certificate using a recipient address. According to this exemplary illustration, a user first enters an electronic messaging application 501 resident on or accessible to the device being used by the user. Such devices may include, for example, a mobile wireless communication device that is capable of supporting electronic mail functions, as discussed above. The user then enters a recipient address 503 in the appropriate field of the electronic mail message to be sent. The system then conducts a search for the recipient's certificate by attempting to locate the recipient address in certificates resident on the device 507. Alternatively, the system may be configured to search certificates stored on a server of the system. If the recipient address is found in a certificate available to the device 509, the user may continue with the electronic mailing process using the recipient's certificate 511. On the other hand, if no certificate containing the recipient address is found 509, the system and method according to an exemplary embodiment then searches for the recipient certificate using a canonical or generic domain name and/or a canonical or generic user name 513. For simplicity, the examples described herein refer generally to a canonical or generic domain name. However, it will be understood that the application applies equally to the use of a canonical or generic user name in place of a generic or canonical domain name, and to a combination of canonical or generic domain and user names. As described above, the canonical or generic domain name may be, for example, a lifelong address that is assigned to a person for the duration of their tenure with a specific agency, organization, company, or the like. If the certificate is found using the canonical or generic domain name 515, the user may continue the messaging process 511. If no certificate is found 515, a notification may be provided to the user that no certificate match for the address was found 517. While the electronic mail handling system and method is described herein with respect to processing at the electronic mail device itself, it will be understood that the system and method may be implemented by any suitable means, such as, for example, an e-mail server, or the like, and that the disclosure is directed to a system and method for handling electronic mail mismatches regardless of where the certificates are stored or which device(s) in the system implement the method.

Figure 6:
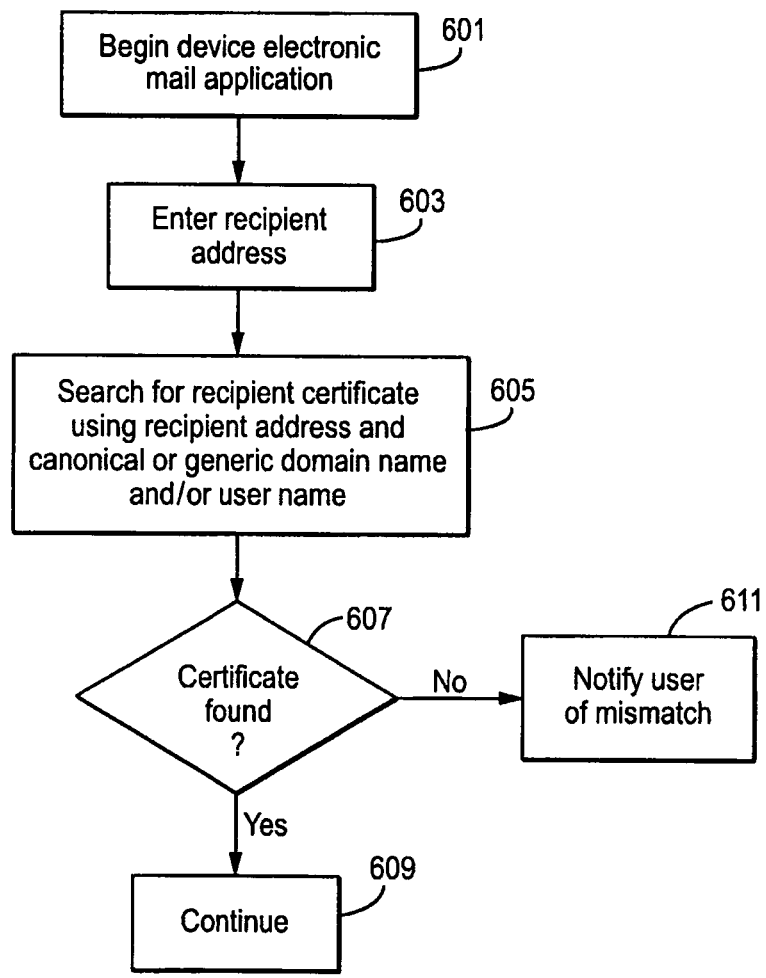
FIG. 6 is another exemplary abbreviated flow diagram of a method used in a system for handling electronic mail mismatches in a recipient address.

FIG. 6 is an exemplary abbreviated flow diagram of an alternative method for use in a system for handling electronic mail mismatches when searching for a recipient's certificate using a recipient address. The exemplary method illustrated in FIG. 6 is similar to that of FIG. 5. However, in the FIG. 6 embodiment, the search for the recipient certificate is conducted using the recipient address and canonical or generic domain name concurrently. According to this exemplary embodiment, the user enters the electronic messaging application 601, and enters recipient e-mail address in the appropriate field 603. The system then conducts a search for the recipient's certificate by attempting to locate the recipient address in certificates resident on or accessible to the device and by attempting to locate a canonical or generic domain name associated with the recipient concurrently 605. If a certificate is found 607, the user may continue the messaging process 609. If no match is found 607, a notification may be provided to the user of a mismatch 611. As discussed above, searching for both the recipient address and a canonical or generic domain name associated with the recipient concurrently may provide efficiencies of speed and processing overhead.

Figure 7:
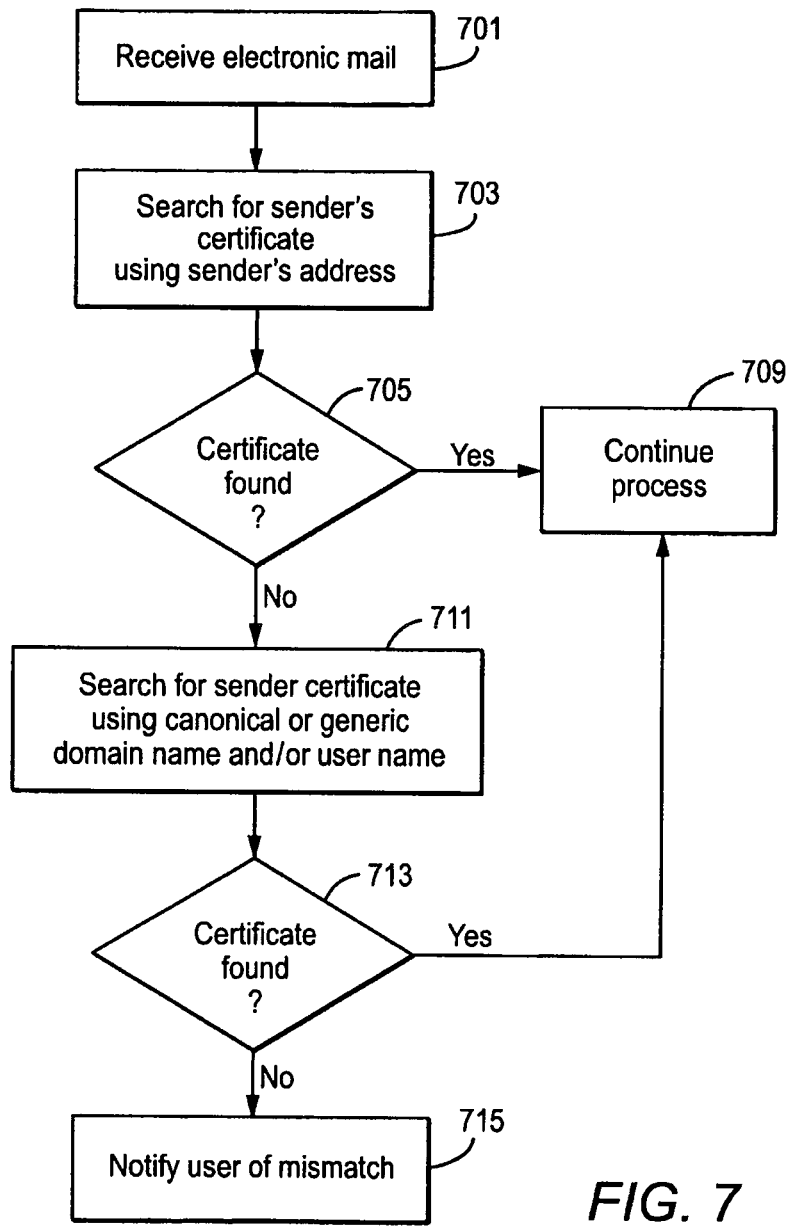
FIG. 7 is an exemplary abbreviated flow diagram of a method used in a system for handling electronic mail mismatches in a sender's address.

FIG. 7 is an exemplary abbreviated flow diagram of a method used in a system for handling electronic mail mismatches when searching for a sender's certificate using a sender's address. The process illustrated in FIG. 7 is similar to that illustrated in FIG. 5, with the certificate search being based on the sender's e-mail address or canonical or generic domain name associated with the sender. According to this exemplary embodiment, after a user receives an electronic message 701, the system institutes a search for the sender's certificate based on the sender's e-mail address that was used to send the message 703. If a corresponding certificate is found based on the sender's address 705, the user may continue the process of verifying the user's information, such as, for example, the user's digital signature 709. If no certificate corresponding to the sender is found 705, the system may then search for the sender certificate using a canonical or generic domain name associated with the sender's lifelong address 711. If a certificate associated with the sender is found 713, the user may then continue the processing of the received mail 709. If no match is found 713, the user may be notified of a mismatch 715.

While the electronic mail handling system and method is described herein with respect to processing at the electronic mail device itself, it will be understood that the system and method may be implemented by any suitable means, such as, for example, an e-mail server, or the like, and that the disclosure is directed to a system and method for handling electronic mail mismatches regardless of where the certificates are stored or which device(s) in the system implement the method.

Figure 8:
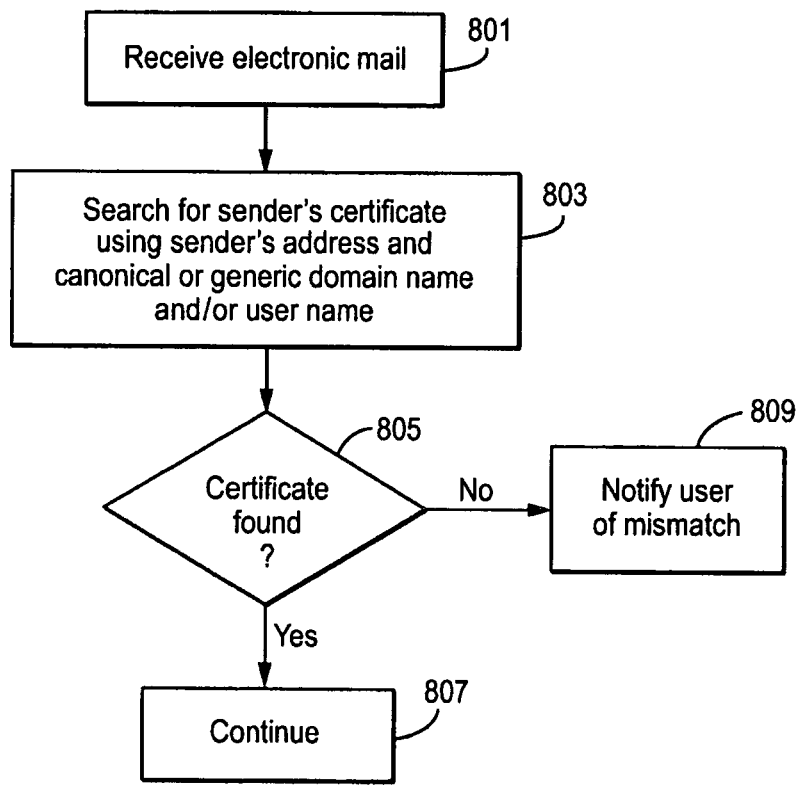
FIG. 8 is another exemplary abbreviated flow diagram of a method used in a system for handling electronic mail mismatches in a sender's address.

FIG. 8 is an exemplary abbreviated flow diagram of an alternative method for use in a system for handling electronic mail mismatches when searching for a sender's certificate using a sender's address. The exemplary method illustrated in FIG. 8 is similar to that of FIG. 7. However, in the FIG. 8 embodiment, the search for the sender's certificate is conducted using the sender's address and canonical or generic domain name concurrently. According to the example illustrated in FIG. 8, the user receives an electronic message 801. The system then conducts a search for the sender's certificate by attempting to locate the sender's address in certificates resident on or accessible to the device and by attempting to locate a canonical or generic domain name associated with the sender concurrently 803. If a certificate is found 805, the user may continue the messaging process 809. If no match is found 805, a notification may be provided to the user of a mismatch 807. As discussed above, searching for both the sender's address and a canonical or generic domain name associated with the sender concurrently may provide efficiencies of speed and processing overhead.

As discussed herein, the device within the system that provides the electronic message mismatch handling as described with respect to the illustrative embodiments discussed in detail above, may be any device within the system, including, but not limited to the electronic messaging device itself, a server within the system, or the like.

Furthermore, as discussed above, the system may be configured to search for a canonical or generic user name in place of (or in addition to) a canonical or generic domain name to search for a certificate or to resolve a mismatch. Typically, e-mail addresses are composed of two main parts—the user name and the domain name, for example, user name@domain name. The examples set forth above are described with respect to using a canonical or generic domain name when searching for a certificate or when attempting to resolve a mismatch. However, it is also contemplated that a canonical or generic user name may be used to search for a certificate or resolve a mismatch. For example, the user name may change as an employee moves or is assigned to different departments within an agency. For instance, the lifelong address may be John.Doe@agency.gov, but the user name may change as John Doe is assigned to different offices or departments within the agency, for example, John.Doe_Legal@agency.gov,
John.Doe_accounting@agency.gov,
John.Doe_Solicitor@agency.gov, etc.

In this example, to search for a certificate or to resolve a mismatch, the system may utilize a canonical or generic user name, e.g., by truncating the portion of the user name following the underscore in the examples set forth above. The system administrator would be able to set the rules for using canonical and/or generic user names or domain names based on the structure of the address via IT policy. FIG. 9 is an exemplary screen shot illustrating an exemplary administrator screen that may be used to assign a generic or canonical name to a user's certificate. As illustrated in this exemplary screen shot, the system administrator, for example, may be provided with the ability to enter data in a field that reflects a long-lived (e.g., canonical or generic name) associated with a particular user. The screen shot also provides a rule associated with the field relating to the use of canonical or generic names for long-lived addresses.

In yet a further exemplary implementation, using a combination of canonical or generic domain names and user names to search for a certificate or to resolve a mismatch may also be used to provide a more robust solution.

It will be understood that the methods described herein for locating a certificate of a sender or recipient of an electronic message may be embodied in executable program logic. The executable program logic may reside on the device or on a server within the system that processes electronic messages. Moreover, the executable program logic may be transmitted or received by various devices and circuits within devices of the system on a carrier wave modulated by a signal representing the corresponding program logic or executable code, or the like, or any other suitable communication medium.

While the foregoing has been described in conjunction with specific exemplary embodiments, it is evident that many alternatives, modifications and variations will be apparent to those skilled in the art. Accordingly, the exemplary embodiments set forth herein are intended to be illustrative, not limiting. Various changes may be made without departing from the true spirit and full scope of the invention as defined in the appended claims.

The invention claimed is:

1. A method of locating a digital certificate, the method performed by a processor of a computing device, the method comprising:
    identifying an e-mail address, said e-mail address consisting of a user name and a name of a first domain;
    performing a first search for one or more digital certificates associated with the e-mail address;
    upon determining that no digital certificates associated with the e-mail address consisting of the user name and the name of the first domain are found,
        truncating the name of the first domain to identify a name of a second domain, and
        performing a second search for one or more digital certificates associated with an address consisting of the user name and the name of the second domain, wherein the first domain is a subdomain of the second domain; and
    processing a message using a located digital certificate associated with the address consisting of the user name and the name of the second domain.

2. The method of claim 1, further comprising providing an indication of a result of said second search, wherein said indication indicates whether at least one digital certificate associated with the address consisting of the user name and the name of the second domain was found as a result of said second search.

3. The method of claim 1, further comprising truncating the user name to identify a second user name, and searching for one or more digital certificates associated with an address consisting of the second user name and the name of the second domain.

4. The method of claim 1, wherein the computing device comprises a mobile device.

5. The method of claim 1, wherein the second search comprises searching digital certificates resident on the computing device.

6. The method of claim 1, wherein the second search comprises searching digital certificates stored on a server.

7. The method of claim 1, wherein the message comprises an e-mail message, and wherein the identified e-mail address is associated with a recipient of the e-mail message to be sent from the computing device.

8. The method of claim 1, wherein the message comprises an e-mail message, and wherein the identified e-mail address is associated with a sender of the e-mail message received at the computing device.

9. A computing device configured to locate a digital certificate, wherein a processor of the computing device is configured to:
    identify an e-mail address, said e-mail address consisting of a user name and a name of a first domain;
    perform a first search for one or more digital certificates associated with the e-mail address;
    determine if any digital certificates associated with the e-mail address consisting of the user name and the name of the first domain are found;
    upon determining that no digital certificates associated with the e-mail address consisting of the user name and the name of the first domain are found,
        truncate the name of the first domain to identify a name of a second domain;
        perform a second search for one or more digital certificates associated with an address consisting of the user name and the name of the second domain, wherein the first domain is a subdomain of the second domain; and
    process a message using a located digital certificate associated with the address consisting of the user name and the name of the second domain.

10. The device of claim 9, wherein the processor is further configured to provide an indication of a result of said second search, and wherein said indication indicates whether at least one digital certificate associated with the address consisting of the user name and the name of the second domain was found as a result of said second search.

11. The device of claim 9, wherein the processor is further configured to truncate the user name to identify a second user name, and search for one or more digital certificates associated with an address consisting of the second user name and the name of the second domain.

12. The device of claim 9, wherein the device comprises a mobile device.

13. The device of claim 9, wherein the processor is configured to perform the second search by searching for digital certificates resident on the computing device.

14. The device of claim 9, wherein the processor is configured to perform the second search by searching for digital certificates stored on a server.

15. The device of claim 9, wherein the message comprises an e-mail message, and wherein the identified e-mail address is associated with a recipient of the e-mail message to be sent from the computing device.

16. The device of claim 9, wherein the message comprises an e-mail message, and wherein the identified e-mail address is associated with a sender of the e-mail message received at the computing device.

17. A non-transitory computer readable storage medium for storing instructions for locating a digital certificate, the instructions for execution by a processor of a computing device, wherein the instructions configure the processor to:
- identify an e-mail address, said e-mail address consisting of a user name and a name of a first domain;
- perform a first search for one or more digital certificates associated with the e-mail address;
- upon determining that no digital certificates associated with the e-mail address consisting of the user name and the name of the first domain are found,
- truncate the name of the first domain to identify a name of a second domain, and
- perform a second search for one or more digital certificates associated with an address consisting of the user name and the name of the second domain, wherein the first domain is a subdomain of the second domain; and
- process a message using a located digital certificate associated with the address consisting of the user name and the name of the second domain.

18. The medium of claim 17, wherein the processor is further configured to provide an indication of a result of said second search, wherein said indication indicates whether at least one digital certificate associated with the address consisting of the user name and the name of the second domain was found as a result of said second search.

19. The medium of claim 17, wherein the processor is further configured to truncate the user name to identify a second user name, and searching for one or more digital certificates associated with an address consisting of the second user name and the name of the second domain.

20. The medium of claim 17, wherein the computing device comprises a mobile device.

* * * * *